US006999194B2

(12) United States Patent
Kurihara

(10) Patent No.: US 6,999,194 B2
(45) Date of Patent: Feb. 14, 2006

(54) PRINT OPERATION PROCESSING DEVICE FOR SERIAL PRINTER

(75) Inventor: Masashi Kurihara, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1008 days.

(21) Appl. No.: 09/838,278

(22) Filed: Apr. 20, 2001

(65) Prior Publication Data

US 2001/0033389 A1 Oct. 25, 2001

(30) Foreign Application Priority Data

Apr. 21, 2000 (JP) .................................... 2000-120661

(51) Int. Cl.
*G06F 15/00* (2006.01)

(52) U.S. Cl. ...................... 358/1.18; 358/1.1; 358/1.2; 358/296; 347/19; 347/20

(58) Field of Classification Search ............... 358/1.18, 358/1.1, 296, 1.2; 347/19, 20
See application file for complete search history.

(56) References Cited

U.S. PATENT DOCUMENTS 6,006,294 A 12/1999 Kurihara ...................... 710/52

*Primary Examiner*—Twyler Lamb
(74) *Attorney, Agent, or Firm*—Fitzpatrick, Cella, Harper & Scinto

(57) ABSTRACT

The objective of the present invention is to solve a problem that a printing throughput is not improved so much in a conventional printing processing device arranged for example in a serial printer such as an ink-jet printer etc., due to a requirement to repeat printing in the main scanning direction and feeding a paper in the sub scanning direction, until a blank area where the printing is not allowed is confirmed in printing different data on respective discrete papers. To fulfill the objective a function to supply the succeeding paper while the current paper is held in the printer and means to change supplying conditions of the paper and to adjust overlapping extent of papers are arranged in a device where a print operation is executed by a combination of the printing in the main scanning direction and paper feeding in the sub scanning direction.

8 Claims, 3 Drawing Sheets

PRINT OPERATION PROCESSING DEVICE FOR SERIAL PRINTER

BACKGROUND OF THE INVENTION

1. Field of the Invention

The present invention relates to a print operation processing device for a serial printer such as an ink-jet printer and the like to execute a cycle of operation for supplying, printing and ejecting a discrete paper or to repeat the above-mentioned operation for continuous printing on discrete papers where the succeeding paper is overlapped at a desired position of the current paper in accordance with a printing area of the current paper so as to execute a successive printing effectively for raising a throughput of the printing, by saving ejecting time for blank areas of the current paper.

2. Brief Description of the Related Art

The print operation processing device mentioned above has a function to execute successive printing on a plurality of discrete papers. Typically, the print operation for the discrete paper consists of paper supply, printing and paper ejecting procedures etc. When successive printing on a plurality of discrete papers is required, the requirements are fulfilled by the conventional systems when the above-mentioned cycle of a print operation on the discrete paper is repeated.

The above-mentioned print operation processing device attains the print operation on the discrete paper or a plurality of the discrete papers by a combination of paper supply, printing and paper ejection procedures on one discrete paper, but these procedures are executed on the discrete paper basis independently even when the successive printing is required. Some printers execute paper ejection and supply procedures simultaneously.

In the above-mentioned conventional print operation processing devices, the print operation for each paper is completely independent. Though some printers attain ejecting the current paper and supplying the succeeding paper simultaneously, operations are executed routinely regardless of the area size to be printed and without overlapping papers. Consequently, total throughputs of the print operations are insufficient.

When a large amount of data with different contents for each paper are printed by employing the above-mentioned means, for example, the throughput of the printing is improved to a certain extent compared with printing by the ordinary system. Since succeeding paper is supplied partly parallel to ejecting the current paper only after current paper is ejected out of the printing margin in the sub scanning direction, the throughput of the printing is improved to some extent compared with the ordinary printing procedure where paper supply and ejection are executed independently. However the effect is limited due to that paper ejection and supply procedures are automatically executed regardless of data amount to be printed on the current paper.

Typically, when data with different contents for each paper are printed continuously on discrete papers, a series of print operations are executed according to the following sequence as shown in FIG. 2, which is explained later. The printing sequence comprises (1) paper supply, (2) repeat operations of printing in the main scanning direction and paper feed in the sub scanning direction, (3) paper ejection when no data to be printed remain for the current paper or when the current paper passes the lower margin.

As mentioned above, a plurality of the same printings on discrete papers are executed in the same way as described above. In these printings, a time for printing is determined by a time for printing in the main scanning direction, a time for paper feeding in the sub direction and a time for paper ejection/supply. This affects and determines the maximum throughput of the print operation processing device.

SUMMARY OF THE INVENTION

The present invention is carried out in view of the above-mentioned problems. The objective of the present invention is to provide a print operation processing device capable of improving the total printing throughput by a function of the device to supply the succeeding paper even when the current paper is in a supplied state. Once a termination of the printing on the current paper is confirmed by parameters from a host computer or by monitoring paper feeding amount of the current paper in the printer, so as to feed paper effectively in a partially overlapped state with the succeeding paper without changing the printing velocity in the main scanning direction and the paper feeding velocity in the sub scanning direction.

A serial printer having one of the following arrangements (1) to (8) attains the objective of the present invention.

(1) A print processing device equipped in a serial printer comprising: an analyzing unit to analyze a printing command from an apparatus which transmits printing data, a storing area to store an analyzed result by the analyzing unit, a controlling unit to identify stored contents in the storing area and to control a paper feeding device, wherein the controlling unit functions to supply a succeeding paper so as to overlap to a current paper after detecting a lower margin of the current paper after detecting a lower margin of the current paper according to the analyzed result stored in the storing area.

(2) The print processing device equipped in the serial printer according to (1), wherein the controlling unit detects a blank area in the current paper as the lower margin of the current paper.

(3) The print processing device equipped in the serial printer according to (2), wherein the controlling unit detects a blank area according to information on a printing area before a host computer transmits the printing data.

(4) The print processing device equipped in the serial printer according to (3), wherein the detecting function to detect the blank area is activated or deactivated by the host computer or by the printer, and the controlling unit has a setting means to overlap the succeeding paper to the lower margin of the current paper when the detecting function is deactivated in a discrete paper printing.

(5) The print processing device equipped in the serial printer according to (4), wherein the setting means is capable of setting a condition where papers are supplied without an overlapped state.

(6) The print processing device equipped in the serial printer according to (1), wherein the controlling unit supplies the succeeding paper at any timing before ejecting the current paper, and when the paper supply is at an incapable timing due to structural factors of said paper supplying device the succeeding paper is reserved until the timing returns to the capable timing of the paper supply.

(7) The print processing device equipped in the serial printer according to (1), wherein the storing area to store the analyzed result has a storing portion to store a supplying state of the paper, and the controlling unit has a controlling function to write and to read parameters in the storing portion to store the supplying state during the supplying or ejecting operation of the paper.

(8) A print processing method for a serial printer comprising operations of: analyzing a printing command from a device which transmits printing data by an analyzing function arranged in the printer, storing an analyzed result by the analyzing function in a storing area arranged in the printer, identifying contents in the storing area and controlling a paper feeding device by a controlling unit arranged in the printer, wherein the controlling unit functions to supply a succeeding paper so as to overlap to a current paper after detecting a lower margin of the current paper according to the analyzed result stored in the storing area.

DETAILED DESCRIPTION OF THE PREFERRED EMBODIMENTS

Figure 1:
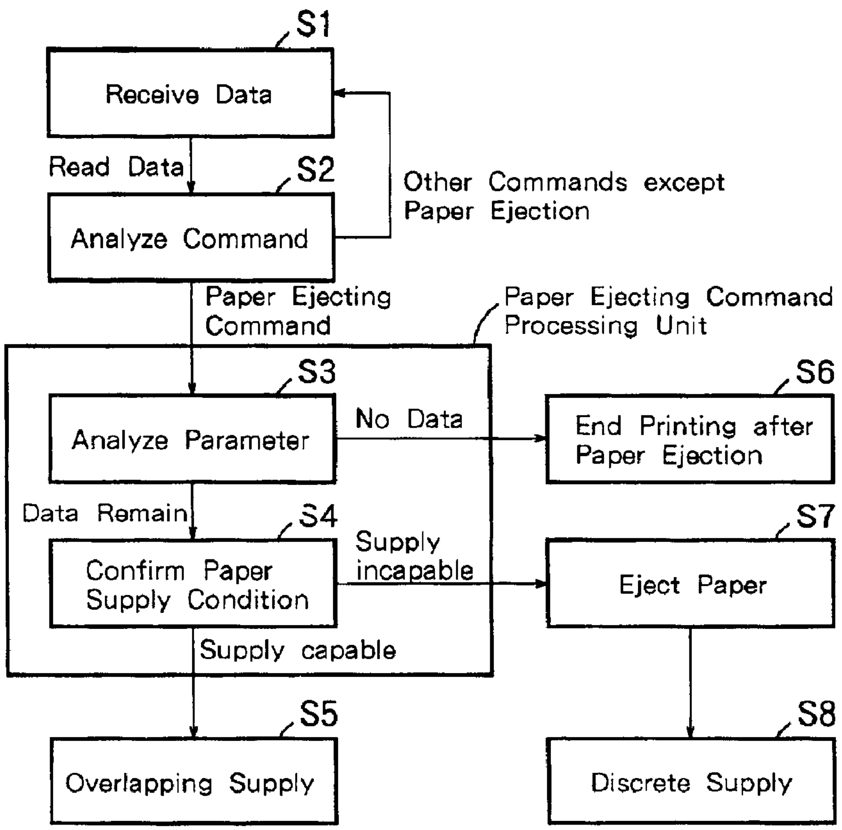
FIG. 1 is a sequence flow chart of a serial printer of an embodiment of the present invention showing from a step of "Analyze Command" to a step of "Supply Paper".

Hereinafter one of the embodiment of the present invention is described in detail by referring to the drawings.

Figure 3:
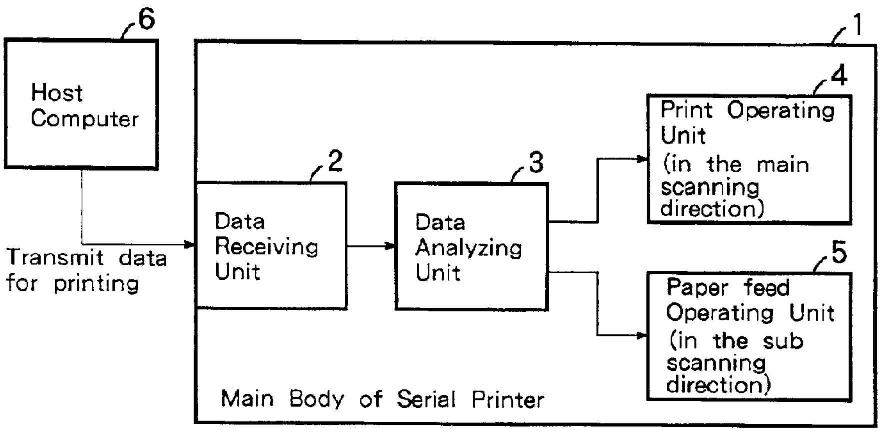
FIG. 3 is a block diagram depicting a main arrangement of the serial printer of the embodiment.

The main arrangement of the serial printer of the present embodiment is shown in FIG. 3. This arrangement is not limited in its specifications, it is applicable to all serial printers having functions described above.

Numeric character 1 is a serial printer, numeric character 2 is a data receiving unit, numeric character 3 is a data analyzing unit, numeric character 4 is a print operating unit, numeric character 5 is a paper feed operating unit and numeric character 6 is a host computer for transmitting data to be printed to the printer 1.

Figure 2:
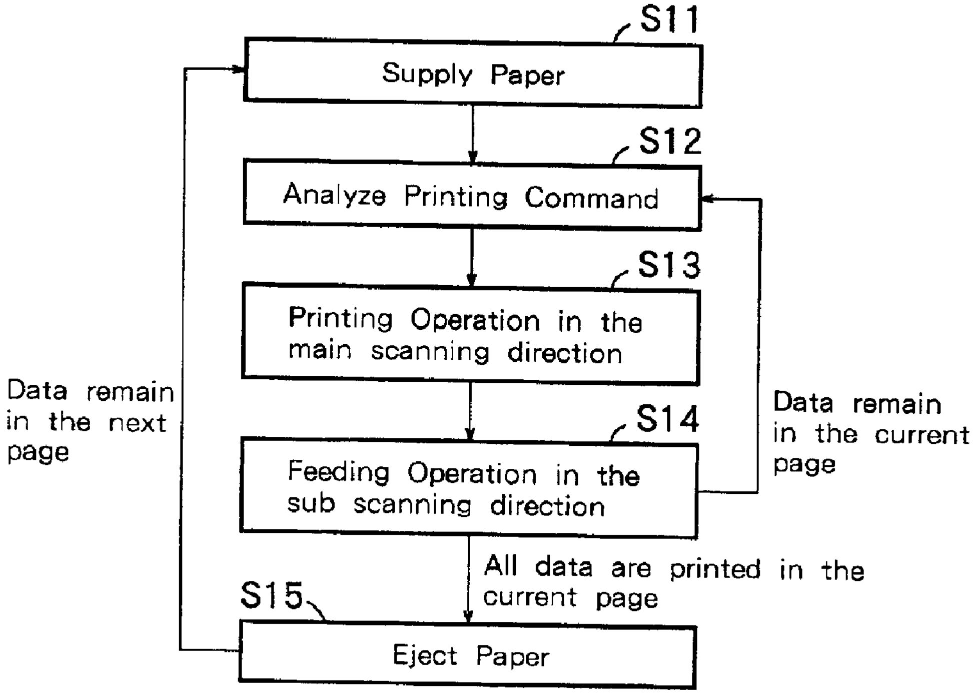
FIG. 2 is a fundamental operating sequence flow chart (from paper supply to paper ejection) of the serial printer of the present invention.

FIG. 2 is the flow chart depicting a fundamental operating sequence of the printer 1 operated by commands from the host computer. A timing for a first paper supply is dependent on a characteristic of the printer and specifications for analyzing printing commands, but it is not a significant point in the present invention so that a further explanation on the timing is omitted.

After supplying a paper to the printer at a step S11, a printing command from the host computer is analyzed at a step S12. Then the printing on the paper is executed by repeating a cycle comprising a step S13 (a print operation in the main scanning direction) and a step S14 (a feeding operation in the sub scanning direction). The print operation on one sheet of the paper is finished by a command indicating no remaining data for printing or by a command instructing paper ejection transmitted from the main computer to the printer. When the printer recognizes ejecting conditions, that is, the printer recognizes the end of a printing area of the current paper, a step S15 of ejecting the current paper is initiated. In case data to be printed on the succeeding paper still remain, a print operation on the succeeding paper is executed without an idle time waiting for the next step, followed by supplying the succeeding paper in the step S11 and ejecting the current paper in the step S15 simultaneously. The step of recognizing the end of printing area also includes detecting a blank area (an area where no data for printing are assigned) in the current paper. For that purpose, a method where the host computer transmits information on the printing area before transmitting data to be printed or a method where the printer detects the printing area by analyzing data to be printed is employable.

The above-mentioned procedure is described more specifically by referring the sequence flow chart in FIG. 1 illustrating from a step of analyzing command to a step of supplying the succeeding paper in the serial printer.

Here a step of receiving a command to eject the paper as one of the confirming means to initiate ejecting the paper is explained.

At step S1, the data receiving unit 2 (FIG. 3) reads data from the host computer 6 (FIG. 3). At step S2, the data are analyzed by the data analyzing unit 3 (FIG. 3) and the data are stored in a storage area for the analyzed results (not shown). When the data include other commands except the command to eject the paper, the printing procedure returns to step S1. When the printer receives the command to eject the paper, the printer controls paper feed in accordance with the stored data. At step S3, "Analyzing Parameter", the data analyzing unit (FIG. 3) judges whether the parameter in the command to eject the paper indicates data for printing remain or not. When the parameter indicates no data for printing remain, the print operation is finished after ejecting the paper (step S6).

At step S3, when the parameter indicates the data for printing still remain, the print operation goes to step S4, where paper ejecting conditions in an inputting device (not shown) arranged in the printer for changing paper feeding conditions and in a storage area (not shown) inputted via the inputting device are confirmed. If the paper supply is allowed, the print operation goes to step S5 where overlapping supply of paper is executed. If not, the print operation goes to step S7 where the paper is ejected and goes to step S8 for discrete supply of the paper.

Hereinafter the above-mentioned print operation is explained again in other words for a better understanding. When the command to eject the paper is received, the printer 1 usually ejects the current paper after the print operation is finished. At step S2 the printer 1 recognizes whether the succeeding printing is required or not by a parameter in the command set in the above-mentioned storage area via the above-mentioned inputting device indicating the data still remain. And the printer confirms the supply of the succeeding paper by referring the data stored in the above-mentioned storage area immediately before ejecting the current paper.

In the procedure to confirm the supply of the succeeding paper, the current medium is confirmed and it is judged whether the overlapping supply is allowed or not (step S4). More specifically, specifications and functions of the current printer, and properties of the current medium are checked for whether the overlapping supply is allowed or not. If not, the ordinary paper ejection (step S7) is executed without executing the overlapping supply. Even when conditions allow the overlapping supply, but when an overlapping position is determined by the structure of the printer, the supply of the succeeding paper is reserved until the current paper reaches a position where the overlapping supply is possible. In other words, even when it is judged that the paper supply is allowed, but actually it is not allowed due to the structure of the printer, the papers are accumulated until the printer returns to a state where the paper supply is allowable.

When the situation is allowed and the overlapping supply is executed (step S5), a distance between the printing area of the current paper and an ejecting surface (of the ink-jet printer, for example) is adjusted in accordance with a type and a size of the paper, if necessary.

A case when more than two sheets of the paper are overlapped owing to areas to be printed of respective papers, is also allowed, if conditions such as an accuracy of a paper supplying structure, etc. are fulfilled. If the number of papers to be overlapped is limited due to the accuracy, the supply of the succeeding paper is reserved according to the above-mentioned function until conditions are fulfilled.

In the previous example, the overlapping supply is executed according to the checked result of the parameter in the paper ejecting command. But if a command to specify the total number of paper for the current printing is generated or exists, it is used as a condition for supplying the succeeding paper. In this case procedures succeeding to the supplying the paper are the same as the preceding example.

Usually the print operation processing device represented by the serial printer has its proper printing margins in the main and sub scanning directions. In this case, only areas where the printing is not allowed (the lower end margin) may be overlapped by the above-mentioned means without detecting the above-mentioned lower margin or a blank area in the paper. In this case, a function to activate/deactivate detecting the lower margin and the blank area should be preferably arranged in the host computer or the printer.

A feature of this method is that it can immediately respond to the conventionally used command for the printing without adding a new command and a parameter to the data of the host computer, namely, no restrictions on the transmitting side. However, it is less effective in terms of the paper feeding since the timing for the overlapping supply is not set by data to be printed or by controlling commands as the preceding example is.

Since these setting means can be set by the host computer or the above-mentioned inputting device of the printer, it is not necessary to specify a type of the host computer. Though conveying efficiencies of the paper are different depending on specifications of printers, more efficient paper conveyance may be attained by the present invention than by the conventional systems.

According to the preset invention, as already mentioned, the paper supply is realized at a proper timing determined by factors such as the size, type of the recording medium and supplying mechanisms etc., if the printing parameter information on the succeeding paper is added at the ejecting time of the current paper. By employing this method, since papers can be transferred by keeping a state where the blank area of preceding paper is overlapped to that of the succeeding paper so as to print different data on each paper successively, total throughput of the print operation is improved.

In addition it is possible to supply overlapped papers by overlapping the lower margin of the current paper to the upper margin of the succeeding paper. This method attains the improved throughput, even without means for transmitting the printing information on the succeeding paper from the host computer compared with ordinary printings (no overlapped supply).

What is claimed is:

1. A print processing device equipped in a serial printer comprising:

an analyzing unit to analyze a printing command from an apparatus which transmits printing data;

a storing area to store an analyzed result by said analyzing unit; and a controlling unit to identify stored contents in said storing area and to control a paper feeding device, wherein said controlling unit functions to supply a succeeding paper so as to overlap with a current paper after detecting a lower margin of said current paper according to the analyzed result stored in said storing area.

2. The print processing device equipped in the serial printer according to claim 1, wherein said controlling unit detects a blank area in the current paper as the lower margin of said current paper.

3. The print processing device equipped in the serial printer according to claim 2, wherein said controlling unit detects a blank area according to information on a printing area before a host computer transmits the printing data.

4. The print processing device equipped in the serial printer according to claim 3, wherein the detecting function to detect the blank area is activated or deactivated by the host computer or by said printer, and said controlling unit has a setting means to overlap the area succeeding paper to the lower margin of the current paper when the detecting function is deactivated in a discrete paper printing.

5. The print processing device equipped in the serial printer according to claim 4, wherein said setting means is capable of setting a condition where papers are supplied without overlapped state.

6. The print processing device equipped in the serial printer according to claim 1, wherein said controlling unit supplies the succeeding paper at any timing before ejecting the current paper, and when the paper supply is at an incapable timing due to structural factors of said paper feeding device the succeeding paper is reserved until the timing returns to the capable timing of the paper supply.

7. The print processing device equipped in the serial printer according to claim 1, wherein the storing area to store the analyzed result has a storing portion to store a supplying state of the paper, and said controlling unit has a controlling function to write and to read parameters in the storing portion to store the supplying state during supplying or ejecting operation of the paper.

8. A print processing method for a serial printer comprising operations of:

analyzing a printing command from a device which transmits printing data by an analyzing function arranged in the printer;

storing an analyzed result by said analyzing function in a storing area arranged in the printer; and identifying contents in the storing area and controlling a paper feeding device by a controlling unit arranged in the printer, wherein the controlling unit functions to supply a succeeding paper so as to overlap with a current paper after detecting a lower margin of the current paper according to the analyzed result stored in the storing area.

* * * * *

UNITED STATES PATENT AND TRADEMARK OFFICE

CERTIFICATE OF CORRECTION

PATENT NO. : 6,999,194 B2
APPLICATION NO. : 09/838278
DATED : February 14, 2006
INVENTOR(S) : Masashi Kurihara It is certified that error appears in the above-identified patent and that said Letters Patent is hereby corrected as shown below:

ON THE TITLE PAGE, AT (57) ABSTRACT:

Line 9, “objective” should read --objective,--.

Column 6:

Line 36, “device” should read --device,--.

Signed and Sealed this

Twenty-ninth Day of August, 2006

JON W. DUDAS

*Director of the United States Patent and Trademark Office*